United States Patent [19]

Yan

[11] Patent Number: 4,951,202
[45] Date of Patent: Aug. 21, 1990

[54] ORIENTAL LANGUAGE PROCESSING SYSTEM

[76] Inventor: Miin J. Yan, 4325 Bromyard Ave., Cincinnati, Ohio 45241

[21] Appl. No.: 358,486

[22] Filed: May 26, 1989

Related U.S. Application Data

[63] Continuation of Ser. No. 864,305, May 19, 1986, abandoned.

[51] Int. Cl.$^5$ .......................... B41J 1/52; G06F 15/38
[52] U.S. Cl. ...................................... 364/419; 400/110
[58] Field of Search ................. 364/419; 400/110, 112

[56] References Cited

U.S. PATENT DOCUMENTS

| | | | |
|---|---|---|---|
| 4,096,934 | 6/1978 | Kirmser et al. | 400/102 |
| 4,379,288 | 4/1983 | Leuing et al. | 400/110 |
| 4,468,756 | 8/1984 | Chan | 400/110 |
| 4,484,305 | 11/1984 | Ho | 400/110 |
| 4,498,143 | 2/1985 | Strzelecki | 400/110 |
| 4,679,951 | 7/1987 | King et al. | 400/110 |
| 4,698,758 | 10/1987 | Larsen | 364/419 |

*Primary Examiner*—Jerry Smith
*Assistant Examiner*—Kim Thanh Tbui
*Attorney, Agent, or Firm*—John F. C. Glenn

[57] ABSTRACT

The expression of characters in Chinese, Japanese or Korean languages in a directly readable code suitable for input through a small keyboard into an information processor. Output is in the input code or the equivalent conventional ideographic characters. The code uses arrangements of pronunciation signs and determinative signs in an order derived from the conventional stroke orders of the respective characters. The determinative signs are derived from a selected group of conventional radicals and are used to differentiate among homonymic characters.

16 Claims, 17 Drawing Sheets

FIG. 1A

| Determinative | Meaning | Japanese | Korean | Simplified |
|---|---|---|---|---|
| 上 | above | | | |
| 亻 | person | 人 | | |
| 九 | nine | | | |
| 八 | eight | 八 | | |
| 力 | force | 力 | | |
| 刂 | knife | 刀 | 刀 | |
| 包 | wrap | | | |
| 十 | ten | | | |
| 氵 | water | 水 | | |
| レ | | | | |
| 口 | mouth | 日 | ㅁ | |
| 土 | earth | | | |
| 大 | big | | | |
| 女 | female | | | |
| 子 | son | | | |
| 宀 | roof | 穴 | | |
| 山 | mountain | | | |
| 巾 | ribbon | | | |
| 广 | covering | | | |
| 弓 | bow | | | |
| 阝 | ear | | | |
| 忄 | heart | | 忄 | |
| 扌 | hand | | | |
| 犭 | dog | | | |
| 艹 | grass | | | |
| 竹 | bamboo | | | |
| 羽 | feather | | | |
| 戈 | lance | | | |
| 木 | wood | 木 | | |
| 欠 | tap | | | |
| 日 | sun | | | |
| 歹 | vicious | | | |
| 毛 | hair | | | |

FIG. 1B

| Determinative | Meaning | Japanese | Korean | Simplified |
|---|---|---|---|---|
| 气 | gas | | . | |
| 火 | fire | | | |
| 冬 | foot | | | |
| 王 | jade | | | |
| 月 | moon | | | |
| 戶 | door | | | |
| 四 | four | | | |
| 田 | field | | | |
| 广 | disease | | | |
| 皮 | skin | | | |
| 皿 | vessel | | | 皿 |
| 目 | eye | | | |
| 石 | stone | | | |
| 示 | show | | | |
| 禾 | crops | | | |
| 立 | stand | | | |
| 米 | rice | | | 纟 |
| 糸 | silk | | | 舟 |
| 舟 | boat | | | 虫 |
| 虫 | insect | | | 衣 |
| 衣 | cloth | | | 贝 |
| 貝 | shell | | | 讠 |
| 言 | speech | | | 车 |
| 車 | car | | | 西 |
| 酉 | spirits | | | 钅 |
| 金 | gold | | | 雨 |
| 雨 | rain | | | 页 |
| 頁 | page | | | 饣 |
| 食 | eat | | | 马 |
| 馬 | horse | | | 鱼 |
| 魚 | fish | | | 鸟 |
| 鳥 | bird | | | |

FIG. 1C

| Determinative | Pinyin | Abbr. | Other Radicals Included |
|---|---|---|---|
| 亠 | tóu | TO | 一、二 |
| 亻 | rén | R | 人欠尸入 |
| 九 | jiǔ | JU | 儿几丿乙兀无尢鬼乚 |
| 八 | bā | BA | 八角羊父 |
| 力 | lì | L | (工) |
| 刂 | dāo | D | 刀彳ク |
| 勹 | bāo | BO | 包勺己巳(色) |
| 十 | shí | SH | 干斗幸士克 |
| 乚 | shuǐ | S | 水冫川巛厷 |
| 口 | kǒu | K | 曰舌齒 |
| 土 | tǔ | T | (生) |
| 大 | dà | DA | |
| 女 | nǚ | NU | |
| 子 | zǐ | ZI | 孑孓(丁) |
| 宀 | mián | A | 穴冖 |
| 山 | shān | SN | |
| 巾 | jīn | JN | 犭 |
| 广 | ān | AN | 厂尸舍 |
| 弓 | gōng | GN | |
| 阝 | ěr | E | 耳卩邑阜音 |
| 忄 | xīn | X | 心 |
| 扌 | shǒu | SO | 手廾鬥又殳寸彐聿聿隶夫(力) |
| 犭 | quǎn | Q | 犬豕多鹿鼠虍牛羊 |
| 艹 | cǎo | C | 艸艹青麻 |
| 竹 | zhú | ZU | 竹竹 |
| 刃 | yǔ | UI | 羽飛非 |
| 戈 | gē | G | 戈予 |
| 木 | mù | M | 片果 |
| 攵 | pù | PU | 文支欠夊 |
| 日 | rì | RI | 白阜 |
| 歹 | dǎi | DI | |
| 毛 | máo | MO | 髟彡(屮) |

FIG. 1D

| Determinative | Pinyin | Abbr. | Other Radicals Included |
|---|---|---|---|
| 气 | qì | QI | |
| 火 | huǒ | H | 赤黑光 |
| 疋 | zhǐ | Z | 足疋夂走夊疋亻亍爪⺌止舛 |
| 玉 | yù | YU | 玉王 |
| 月 | yuè | UE | 肉骨夕 |
| 門 | mén | ME | 門戶 |
| 厶 | sì | SF | 口(囲)(罔) |
| 田 | tián | TN | 里 |
| 疒 | chuáng | CU | |
| 皮 | pí | P | 草韋 |
| 皿 | mǐn | MN | 匚工瓦缶臼豆鼎瓜高凵 |
| 目 | mù | MU | 見 |
| 石 | shí | SR | |
| 示 | shì | SK | |
| 禾 | hé | HE | 耒香麥 |
| 立 | lì | LI | 辛 |
| 米 | mǐ | MI | |
| 糸 | sī | SI | (幺) |
| 舟 | zhōu | ZO | |
| 虫 | chóng | CG | 黽龍 |
| 衣 | yī | I | (网)䖝 |
| 貝 | bèi | B | |
| 言 | yán | Y | |
| 車 | chē | CH | |
| 酉 | yǒu | YO | 鹵 |
| 金 | jīn | J | |
| 雨 | yǔ | IU | |
| 頁 | yè | YE | 身首面自(鼻)(百) |
| 食 | shí | SW | |
| 馬 | mǎ | MA | |
| 魚 | yú | U | 龜 |
| 鳥 | niǎo | N | 隹 |

FIG. 2

| Homonymic Characters | Chinese Determinative-Pronunciation Coding | | |
|---|---|---|---|
| 20 → ㄇㄨˋ (mù) | National Phonetic Scripts | Pinyin | Radical Abbr. |
| 21 → 暮 | 22 → ㄇㄨ日 | mu日 | muRI |
| 墓 | ㄇㄨ土 | mu土 | muT |
| 慕 | ㄇㄨ忄 | mu忄 | muX |
| 募 | ㄇㄨ力 | mu力 | muL |
| 幕 | ㄇㄨ巾 | mu巾 | muJN |
| 23 → 木 | 木 | 木 | M |
| 24 → 沐 | 26 → 氵木 | 氵木 | Smù |
| 霂 | 雨ㄇㄨ | 雨mù | IUmù |
| 28 → 目 | 目 | 目 | MU |
| 25 → 牧 | 27 → 攵ㄇㄨ | 攵mù | Qmù |
| 鶩 | ㄇㄨ鳥 | mu鳥 | muN |
| 睦 | 目ㄇㄨ | 目mù | MUmù |
| 穆 | 禾ㄇㄨ | 禾mù | HEmù |

| Homonymic Characters | Japanese Determinative-Pronunciation Coding |
|---|---|
| 70 → エイ | |
| 央 | エイ |
| 永 | エイ水 |
| 68 → 泳 | 72 → 水エイ |
| 英 | 艹エイ |
| 映 | 日エイ |
| 栄 | エイ木 |
| 営 | エイ口 |
| 景 | 日エイ一 |
| 詠 | 讠エイ |
| 影 | エイ毛 |
| 鋭 | 金エイ |
| 衛 | 彳エイ |

FIG. 6

| しるし<br>Homonymic<br>Characters | Japanese<br>Determinative-<br>Pronunciation<br>Coding |
|---|---|
| 印 | しるしβ |
| 志 | しるしけ |
| 表 | しるしホ |
| 章 | 立しるし |
| 瑞 | モしるし |
| 徴 | そしるし |
| 74 ⟶ 標 | 76 ⟶ 米しるし |
| 験 | 与しるし |
| 璽 | しるしモ |
| 識 | さしるし |

FIG. 7

| Homonymic Characters | Korean Determinative-Pronunciation Coding | |
|---|---|---|
| 86 → 단 | Juxtaposed | One-After-Another |
| 80 → 旦 | 84 → 붠 | 82 → ㅂ다ㄴ |
| 但 | 亻단 | 亻다ㄴ |
| 段 | 단ㅈ | 다ㄴㅈ |
| 短 | ㅎ단 | ㅎ다ㄴ |
| 單 | 뮨 | 卩다ㄴ |
| 端 | 立단 | 立다ㄴ |
| 團 | 囗단 | 囗다ㄴ |
| 斷 | 단刀 | 다ㄴ刀 |
| 檀 | 木단 | 木다ㄴ |

FIG. 9A

| Example Number | Ideographic Character | Chinese Determinative-Pronunciation Coding |
|---|---|---|
| 1 | 力 | ㄌ |
| 2 | 碼 | 石马 |
| 3 | 憫 | 忄冂ㄧㄣˇ |
| 4 | 愍 | 冂ㄧㄣˋ |
| 5 | 辯 | 辛ㄅㄧㄢˋ |
| 6 | 荔 | 艹ㄌ |
| 7 | 字 | 宀子 |
| 8 | 民 | 冂ㄧㄣˊ |
| 9 | 諭 | 讠ㄩˋ |
| 10 | 語 | 讠山 |
| 11 | 誓 | 扌己ㄜˋ |
| 12 | 芋 | 艹ㄩ |
| 13 | 籲 | 艹ㄩㄝˋ |

FIG. 9B

| Example Number | Ideographic Character | Chinese Determinative-Pronunciation Coding |
|---|---|---|
| 14 | 芢 | ㄔㄨㄥˊ |
| 15 | 蓬 | ㄔㄨˊ |
| 16 | 暮 | ㄇㄨ日 |
| 17 | 鼎 | ㄉㄧㄥˇ |
| 18 | 皿 | 皿 |
| 19 | 䀹 | ㄋㄞˇ皿 |
| 20 | 耐 | ㄋㄞˇ才 |
| 21 | 繫 | ㄐㄧˋㄠˋ |
| 22 | 系 | ㄒㄧˋㄠˋ |
| 23 | 翟 | ㄓㄜˊ鳥 |
| 24 | 仇 | ㄧˊㄡˊ |
| 25 | 吃 | ㄎㄟˊ |
| 26 | 吃 | ㄎㄐㄧㄥˊ |

ORIENTAL LANGUAGE PROCESSING SYSTEM

This application is a continuation of application Ser. No. 06/864,305, filed 5/19/86 and now abandoned.

BACKGROUND OF THE INVENTION

For efficient human intercommunication through an information processor (including typewriter, computer, teletypewriter, typesetter and the like), it is essential to have a comprehensible coding system with a small number of signs, such as the Roman alphabet for English. However, in the case of the Chinese, Japanese and Korean languages, the conventional written signs consist of thousands of different characters, and hence for each of these languages there has been a long standing need for a system for coding these characters so that the coded signs can be read and understood by an average literate person without coding manual or device, so that the coding identifies the individual conventional characters with precision, so that the coding can be input on a keyboard not much larger than a conventional U.S. typewriter keyboard, and so that the coding is adapted to the information processing technology now in use for transcribing the English language. Efforts in the past to deal with these problems have produced solutions that concentrated on some of these problems without solving them as a whole.

SUMMARY OF THE INVENTION

In accordance with the present invention, the thousands of ideographic characters used in the Orient are precisely and comprehensibly represented by a system of signs of far smaller number. The sign representation can be read and understood directly, and thus, communicates intelligence like a written language. The system of signs consists of a pronunciation portion and a determinative portion. The pronunciation signs are preferably of the conventional phonetics of the Oriental language in question to indicate the pronunciations of the characters as in a dictionary. The determinative signs are used to differentiate the homonymic characters of the said pronunciations. One determinative sign is usually employed for coding each character, although up to a maximum of two are sometimes needed. A determinative sign is placed in the coding substantially in accordance with the stroke order in writing the character in question. A limited number of determinatives are compiled and used for purposes of the invention. The determinative signs selected preferably correspond substantially to a selected limited number of conventional radicals of the characters, for purposes of aiding such direct comprehension.

Input to the information processor may be through any convenient means, such as voice command. However, the input means is preferably a keyboard having keys showing said selected signs, together with a key for spacing to separate each group of one or more sequential signs indicating a particular character. The system is preferably provided with a memory for storing information identifying each of said groups with the corresponding character, and means for optionally displaying either the signs and spaces as they are input, or the corresponding conventional characters.

Other objects, advantages and details of the invention will become apparent as the following disclosure proceeds.

BRIEF DESCRIPTION OF THE DRAWINGS

The accompanying drawings show present preferred embodiments of the invention, as follows:

FIGS. 1A and 1B show the determinatives preferably employed herein for coding purposes, together with the approximate meanings, and preferred signs when different for Japanese, Korean and simplification purpose;

FIGS. 1C and 1D show the pinyin pronunciations of the corresponding determinatives repeated from FIGS. 1A and 1B, together with capital-letter abbreviations, and the other radicals included;

FIG. 2 shows an example of homonymic characters of a Chinese pronunciation coded in accordance with the determinative-pronunciation coding of the invention, in both the Chinese national phonetic scripts and pinyin letters;

FIG. 4A shows an example of the Chinese determinative-pronunciation coding of the invention that would be displayed or printed by an information processor;

FIG. 4B shows the text in conventional Chinese ideographic characters corresponding to the coded text of FIG. 4A;

FIG. 4C shows an example of the Japanese determinative-pronunciation coding of the invention that would be displayed or printed by an information processor;

FIG. 4D shows the conventional Japanese text, which contains both characters and Kana syllabaries, corresponding to the coded text of FIG. 4C;

FIG. 4E shows an example of the Korean determinative-pronunciation coding of the invention that would be displayed or printed by an information processor;

FIG. 4F shows the conventional Korean text, which contains both characters and Hangul letters, corresponding to the coded text of FIG. 4E;

FIG. 5 shows an example of homonymic characters of a Japanese loan word pronunciation and corresponding coding in accordance with the invention by employing the determinative signs and Katakana signs shown in FIG. 3B;

FIG. 6 shows an example of homonymic characters of a Japanese indigenous word pronunciation and corresponding coding in accordance with the invention by employing the determinative signs and Hiragana signs shown in FIG. 3B;

FIG. 7 shows an example of homonymic characters of a Korean pronunciation and corresponding coding in accordance with the invention by employing the preferred Korean determinative signs and the Hangul signs shown in FIG. 3C, in both juxtaposed and one-after-another formats;

FIG. 9A and 9B show examples for the rules for the determinative-pronunciation coding of the invention.

DETAILED DESCRIPTION OF PRESENT PREFERRED EMBODIMENTS OF THE INVENTION

An ideographic character is coded into a pronunciation portion and a determinative portion. Thus, the coding of this invention transforms an ideographic character precisely into a comprehensible string of constituent determinative-pronunciation signs depicting the complete pronunciation and the class of object of the original character. The determinative-pronunciation coding can also be decoded to identify accurately the original ideographic character.

Figure 8:
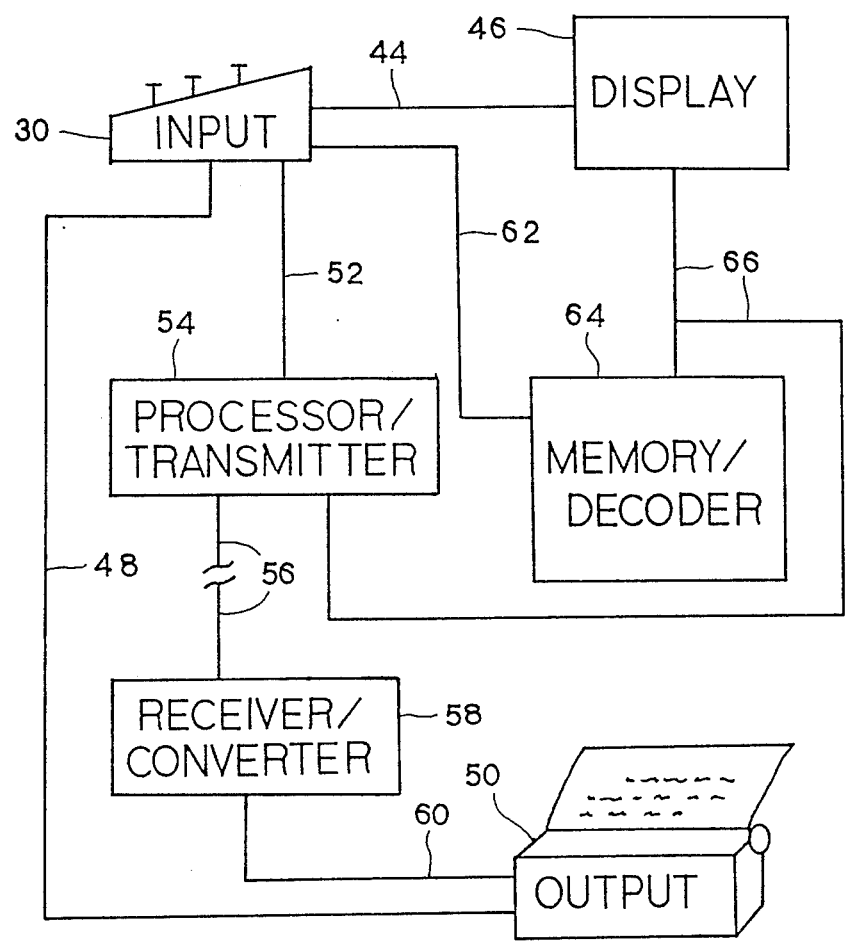
FIG. 8 shows in schematic form an information processor for use in accordance with the invention.

Implementing apparatus is illustrated in FIG. 8, which shows a cable 44 transmitting the signals from a keyboard 30 to display the coded text of determinative-pronunciation strings on a display screen 46. A cable 48 connects keyboard 30 to an output device 50 for printing the coded text, or the text in conventional character form if key 38 is pressed. Editing of the coded text may be done on the screen 46 by use of keyboard 30 to input changes.

The coding strings are delivered through a cable 52 to a data processing and communication device 54 for processing and further transmittal. The transmittal is a wire or wireless communication channel 56 to a receiving device 58, which causes through cable 60 the output devices 50 to print out desired text. This part of an information processing system, except for keyboard signs, is conventional for an alphabetic language such as English.

The present preferred practice of the invention calls for an additional dictionary memory and decoder 64 which stores information on all the desired ideographic characters, with an assigned number for each, and its corresponding letter coding string. The "character" key 38 in FIG. 3 can be activated to cause via cable 62 the memory and decoder 64 to convert a coded text on the display device 46 into a character text or vice versa. The conversion instruction is sent from memory unit 64 through cable 66 to display unit 46. The signal for printing of corresponding character text can also be diverted to the data processing and communication device 54 for further processing and output printing of character text.

Returning now to the coding, the selected pronunciation signs are conventional and preferably the Chinese national phonetic scripts (also called Chinese phonetic symbols) plus tonal signs, for the Chinese language; the Kana syllabaries plus diacritical marks for the Japanese language; and the Hangul letters for the Korean language. Other signs having phonetic value may also be used in transliteration of said pronunciation, especially the Roman alphabet as it is becoming more and more popular in the Orient. One example of such Roman-alphabet transliteration is "pinyin" officially adopted in China and recognized throughout the world. A pronunciation described in pinyin which contains tonal sign has an one-to-one equivalent to one described in the Chinese national phonetic scripts plus tonal sign. In any case, the pronunciation signs are used to describe the complete pronunciation of a spoken form of a character in the Oriental language in question. Said spoken form description of a character is conventional and is indicated in the dictionaries of the language in question. (A character has quite different spoken forms in the different Oriental languages.) The spoken form can comprehensibly represent the characters. It fails, however, to precisely represent a character, because of the great number of homonymic characters very common in any of these Oriental languages.

For precise representation of which one of a group of homonymic characters is meant by their pronunciation, the invention employs a set of determinative signs put alongside the pronunciation for identification.

The required set of determinative signs is obtained by selection from the set of 214 radicals conventionally used in an Oriental language dictionary in classifying and organizing the thousands of ideographic characters used to write the language. In some cases the selected radicals are modified without losing their recognizable identity. The determinative signs of the set each represent a condensed class of objects, as a result of selection from radicals, which conventionally denote classes of objects. 64 determinative signs in a set is preferably preferred for the purposes of the invention.

The invention further provides rules and procedures of selection for the set of determinatives: A reduced set of radicals with the most characters grouped under them is first selected from the conventional 214 radicals. Some of the remaining radicals are also included in the selected set. Most of the selected radicals retain the original forms, while the rest assume modified but still recognizable forms to better represent the included radicals. A single selected radical may be used to represent a group of itself with non-selected radicals if they satisfy one or more of the following conditions: (1) they share the same ideographic origin; (2) they have shared the same meaning at some stage of the ideographic evolution; (3) they share similar or related meaning or form; (4) they are part of one another; (5) they are interchangeable in common practice or due to popular mistakes.

Exploratory coding of all the characters in a dictionary is performed in conjunction with the coding rules hereafter described. The selection procedure is repeated until a desired set of selected radicals, for determinative signs, is achieved. The goal is to obtain a minimum number of selected determinatives and a maximum degree of comprehensibility as a directly readable language form of the coding.

The thousands of characters are a heterogeneous group and have not been amenable to classification in a well-structured manner. Even the entire 214 conventional radicals can not differentiate all the homonymic characters, if an overly simplified approach is taken, such as merely prefixing a radical to the pronunciation signs.

The invention contemplates the representation of a character not only by selection of pronunciation and determinative signs, but also by selection of their relative positions, which may take the form of a stand alone sign set off by spaces, or of a combination of signs arranged side-by-side in a selected sequence between spaces. The present preferred relative positions for identifying purposes are six in number, as follows:

(1) a determinative prefixing the pronunciation signs;
(2) a determinative postfixing the pronunciation signs;
(3) the pronunciation signs alone without any determinative;
(4) one determinative prefixing and another postfixing the pronunciation signs;
(5) a single determinative alone; and
(6) two determinatives side-by-side without any pronunciation sign.

These positional identifiers are listed in order of probable frequency of utilization. More than 95% of the characters are represented by the first four identifiers. The last two identifiers do not contain pronunciation signs. In the fifth identifier, the determinative is itself a character which naturally has a pronunciation. In the sixth identifier, having two determinatives alone, the second determinative, which itself is a character, indicates the pronunciation of the representation. In the fourth or sixth identifier, two determinatives are present which can be of identical or different kinds of signs.

The following rules A, B and C govern the translation of a character into a coded representation through use of one of the said six identifiers:

A. Rules for Determinatives

1. Between homonymic characters that need further differentiation besides one determinative and pronunciation signs, the less popularly used character is accompanied by a marker determinative (Examples 14 and 15 in FIG. 9B). Both ideographic characters in Example 14 and 15 share the same pronunciation and belong to the same radical group. The character in Example 14 (meaning "bushy") is becoming archaic. The frequency of use of this character in publications is low compared to the character in Example 15 (meaning "awning"). The former character carries an additional determinative as marker.

2. The original radicals for some of the characters in the dictionaries have to be modified to reflect closer meaning to the characters. The new determinative sign is, of course, chosen from within the character (Example 16 in FIG. 9B).

3. A number of determinative signs represent some of the less popular radicals having similar meaning or form and include what is covered by the latter radicals; for example, the radical for "container with legs" (Example 17 in FIG. 9B) is replaced by and included into the determinative "container" (Example 18 in FIG. 9B). If the class of such a representation is not readily obvious in coding a character, the use of the representing determinative should be avoided whenever possible. Such representing determinatives can be used to differentiate homonyms or as marker determinative (Example 19 vs. 20 in FIG. 9B).

4. In absence of a better way of choosing determinatives for homonyms, the character having more strokes has more determinatives (Example 21 vs. 22 in FIG. 9B).

5. In choosing a determinative among possible determinatives, choose meaning over stroke order (Example 23 in FIG. 9B); otherwise, choose the first determinative in stroke order (Example 24 in FIG. 9B).

6. For each character, there can be at most two determinatives in the determinative-pronunciation coding, with only one prefixing and only one postfixing the pronunciation letters in Chinese or Japanese; and only one occupying each of the four affixation positions adjacent to a juxtaposition in Korean.

B. Rules for Pronunciation Signs

1. The pronunciation portion of a determinative-pronunciation coding identifies the complete pronunciation of the character coded and is made up of the phonetic signs of the language in question (including the tonal signs in Chinese and diacritical signs in Japanese.) The first Chinese tonal sign should be omitted whenever possible and should, however, be used to (1) mark the word boundaries in a compound word, (2) mark a determinative for correct tone, and (3) mark for the soft tone in some occasions. For Japanese, which has no tonal signs, special provisions are employed to mark boundaries between the coding of a character and what is next to it, such as a dash in a compound word and a space between coding strings. The coding in Korean is separated juxtapositions, which have natural boundaries.

2. Each determinative sign is assigned a proper pronunciation. A determinative-pronunciation coding may have only (up to two) determinatives without any pronunciation sign. The last determinative sign is the sound sign which describes the pronunciation (Example 6 in FIG. 9A).

3. A character having different pronunciations is transformed into as many different determinative-pronunciation codings, sometimes even with different determinatives (Examples 25 and 26 in FIG. 9B).

C. Priority Rules

Choice of determinative-pronunciation signs for coding the ideographic characters follows the following rules, in order of priority of choice:

1.0 When a character is identical to a determinative, it is coded by that sign alone (Example 1 in FIG. 9A).

1.1 When a character is made up of two determinatives, it is coded by those two signs in the same stroke order, and is pronounced according to the second sign (Example 2 in FIG. 9A).

2.0 The next choice for a character is a determinative sign and the pronunciation signs for the character. Whether the determinative prefixes or postfixes the phonetic signs depends upon the original stroke order in writing that character (Examples 3 and 4 in FIG. 9A).

2.1 In case no clearcut stroke order can be found, the determinative sign precedes the phonetic signs (Example 5 in FIG. 9A).

3. The next priority is a determinative sign followed by another determinative sign used as a pronuciation sign (Example 6 in FIG. 9A).

4. The next is pronunciation signs without a determinative sign. A character which is not obviously classified to any determinative sign falls in this priority (Example 8 in FIG. 9A).

5.0 The last priority is using a second determinative sign as marker to identify any character that can not be differentiated by the preceeding rules 2.0 or 2.1 (Examples 9 and 10 in FIG. 9A).

5.1 The marker sign follows the stroke-order rules (Example 11 in FIG. 9A).

6. More popular use of a character merits higher order of priority of choice (Examples 12 and 13 in FIG. 9A).

The examples given above for illustration of the above rules are in Chinese. These rules are also applicable to Japanese and Korean determinative-pronunciation codings, where similar examples are readily apparent. These rules are to be applied like general grammatical rules, where exceptions may occur but only when necessary and unavoidable.

The symbols are coded and displayed in one-after-another linear fashion, which can be horizontal (preferred) or vertical. The Korean Hangul letters, however, are conventionally spelled in a non-linear rectangular (called juxtaposition) form where the additional one or two radicals can be affixed in the juxtaposition either to the left, to the right, or on top, or underneath the phonetic signs.

In the present preferred practice of the invention, 64 determinatives, such as listed in the first column in FIGS. 1A and 1B, are selected. The signs are designed for Chinese. Column 2 in FIGS. 1A and 1B lists the corresponding meaning. Some signs of these determinatives could be confused with those of Japanese Kana or Korean Hangul signs. To avoid confusion, FIGS. 1A and 1B list some alternative determinative signs for Japanese and Korean in Columns 3 and 4, respectively. The last column in FIGS. 1A and 1B list some alternative simplification signs, most of which have been officially adopted in China, Japan and Korea.

Column 1 in FIGS. 1C and 1D repeats the determinatives in FIGS. 1A and 1B, while Column 2 lists the corresponding pinyin pronunciations. Column 3 in FIGS. 1C and 1D lists the preferred abbreviations in capital letters from the pinyin pronunciation. When set side-by-side in a coding, these capital-letter abbreviations are distinguishable from the pinyin pronunciations which are in the lower case letters. The last column in FIGS. 1C and 1D lists about 153 radicals included in and represented by the appropriate determinative signs in the first column. When representing an included radical enclosed in parentheses in FIGS. 1C and 1D, a determinative is to be used for marker only. The coding of this type should be employed as the last resort.

To code a character in Chinese, say, "sunset" (see 21 in FIG. 2), its pronunciation in a phonetic system, say Chinese national phonetic scripts plus tonal signs, is first coded (see 20 in FIG. 2). This pronunciation coding is conventional and can be found in a dictionary. The radical sign is usually taken from the radical group in which this character belongs in the dictionary. By oversight, however, this character is grouped in the dictionary under radical "grass". Further analysis of composing radical elements of this character shows that this character can also be under radical "sun", or even radical "big". Since "sunset" relates more to "sun" than to "grass" or "big", the radical "sun" is chosen for present purposes. It is added to the phonetic signs according to the stroke order of the character, and the tonal sign is moved to mark the last non-tonal sign of the coding string, as shown in coding 22 in FIG. 2. In general, this completes the coding process.

FIG. 2 lists the 13 homonymic characters (column 1) of a pronunciation "mu" denoted by signs 20 and their corresponding determinative-pronunciation coding in national phonetic scripts (Column 2) and in pinyin (Column 3). The character 23 in FIG. 2 is coded by itself, since it is a determinative sign. The character 28 is likewise coded by itself. The character 24 in FIG. 2 is coded by its two composing determinatives, radical "water" and radical "wood" (indicated at 26 in FIG. 2). The latter radical denotes the pronunciation of this coding, per pronunciation Rule B.2 above. The rest of the characters in FIG. 2 are each coded with both a determinative sign and pronunciation signs. The character "tending a herd", shown at 25 in FIG. 2, belongs to the included radical "cow", which is represented by the determinative "dog". The character 25 is coded as shown in the coding string 27 in FIG. 2. There is no coding ambiguity in this example. It becomes obvious that, through this coding example, a character is accurately coded into a string of its constituent determinative-pronunciation signs and that the string of constituent determinative-pronunciation signs uniquely represents a single character.

The ideographic characters in Examples 12 and 13 of FIG. 9A refer to two types of vegetation. Both characters belong to the same radical "grass" and share the same pronunciation signs. The determinative-pronunciation coding in Example 13 carries an additional determinative sign, herein referred to as a marker. This extra determinative differentiates these two otherwise identical coding strings. There are, however, few ideographic characters in the entire dictionary that require a marker determinative. The determinatives in Column 3 of FIG. 2 can also be replaced by the corresponding capital abbreviations listed in Column 3 of FIGS. 1C and 1D. as shown in Column 4 of FIG. 2.

Figure 3A:
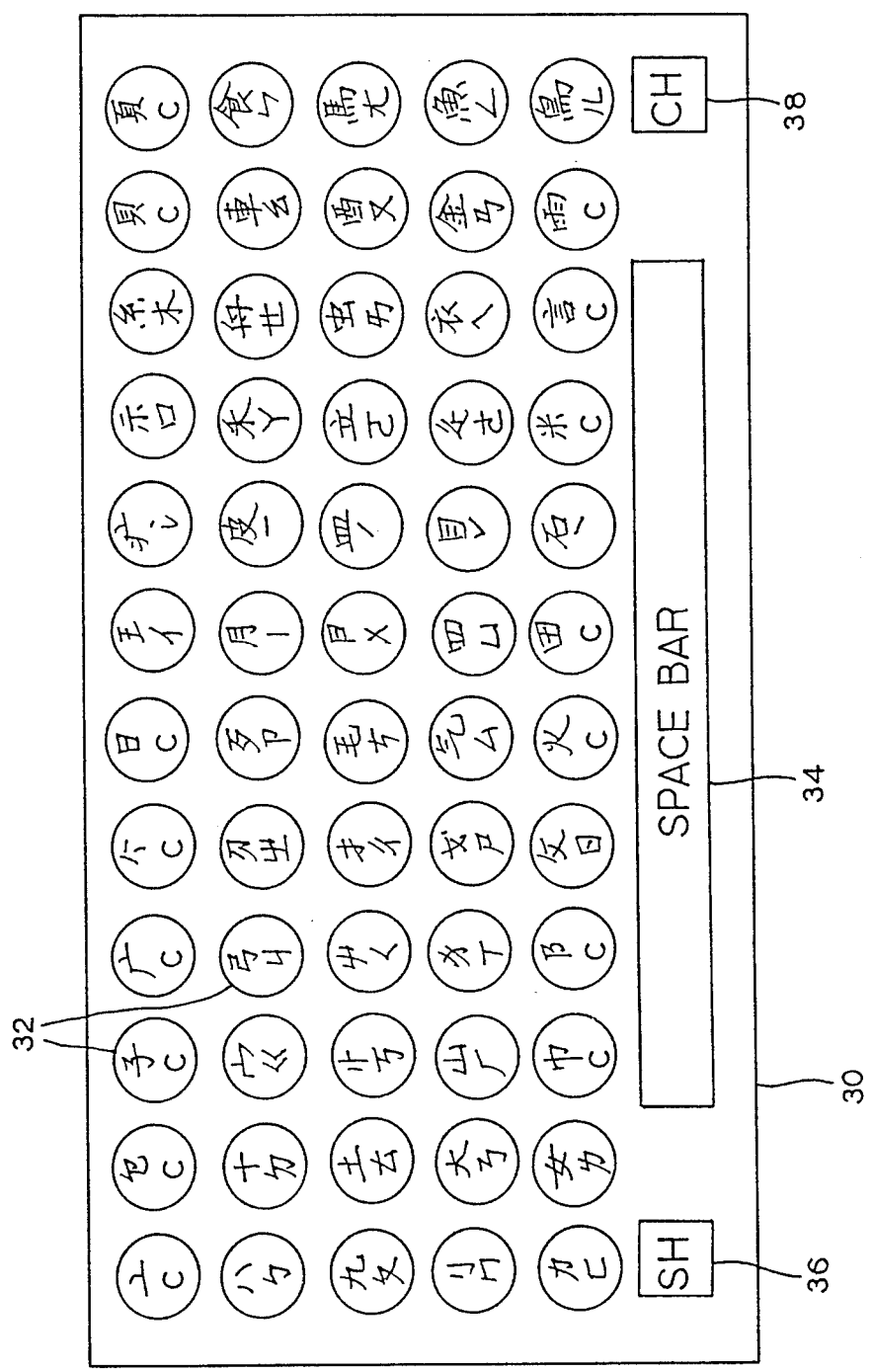
FIG. 3A shows an example of a keyboard for the Chinese determinative-pronunciation coding comprising the determinative signs, Chinese national phonetic scripts and tonal signs.

The coded string of Chinese determinative-pronunciation signs is input through the corresponding keys on the keyboard for Chinese language schematically shown in FIG. 3A. The keyboard 30 shown in FIG. 3A has keys 32 arranged in five horizontal rows and twelve vertical columns for determinative-pronunciation signs. A space bar 34 inputs spaces and a shift key 36 shifts between a lower non-shift position and an upper shift position, corresponding to the lower and upper markings on the keys 32. A key 38, called the character key, may be pressed to cause a display or printout in conventional characters.

Not illustrated are other conventional keys such as those for punctuations and numerals (the latter being preferably on one side in the compact rectangular arrangement commonly used on some keyboards, with Arabic numerals 0 to 9, shown in the non-shifted position of the keys, and corresponding Chinese numerals, shown on the keys in the shifted position). However, some conventional signs may be positioned on those portions (marked "c") of keys 32 not required for the signs mentioned below.

In the following description, horizontal rows are counted down from the top and vertical columns from left to right.

Since the tonal signs are the most frequently used among the determinative-pronunciation signs, they are to be controlled by the index finger of the right hand. They are located in the non-shifted (lower) position of keys 32 in the eighth column from the second row through fifth row. The Chinese national phonetic scripts are on the non-shifted keys 32 located in the second row through fifth row in all columns, except the tonal keys and those keys marked "c" for conventional signs in the fifth (bottom) row.

All keys 32 in the shifted (upper) position contain a determinative sign each. The four most frequently used determinatives are located in the non-shifted keys 32 in the first row not marked "c", i.e. in the seventh through tenth columns.

To input a phonetic sign, the key 32 with the proper sign is activated. To input a determinative sign marked on the key, the key 32 with the proper determinative sign is activated together with the shifted key 36. A string of determinative-pronunciation signs is keyed in the same order as it is coded. A tonal high sign is the last sign keyed in for the character, followed by a space signaled by activating the space bar 34. These input procedures repeat for next characters. For some special functions such as compound word or personal name, two or more strings of determinative-pronunciation signs can be input successively without a space in between. In this case, the tonal sign from the previous string serves as the boundary mark between the two adjacent strings.

FIG. 4A shows an example of coding strings of the invention punctuated by some conventional punctuation marks. This text of determinative-pronunciation coding can be easily understood by an average person who knows the Chinese language and Chinese national scripts. The same text is exprssed in conventional Chinese ideographic characters in FIG. 4B. The approximate English translation is as follows:

The Tale of Borrowing a Stick

Monkey King, Sun Wukong, applied "Water-Separation Magic" and went to the "Water-Crystal Palace" at the bottom of the sea. He wanted to borrow some weapons from the Dragon King.

FIG. 4C shows the same tale in the Japanese determinative-pronunciation coding of the invention, while FIG. 4D shows the corresponding translation in conventional Japanese text. The conventional Japanese text contains both Kana syllabaries (in simpler form) and characters (in more complicated form). FIG. 4E shows the same tale in the Korean determinative-pronunciation coding of the invention, while FIG. 4F shows the corresponding translation in conventional Korean text. Again, the conventional Korean text contains both Hangul letters and characters, both of which are displayed in juxtaposed forms.

A Japanese text may contain characters and both Kana syllabaries. Such Chinese characters are each adopted into Japanese language in two different ways: as a loan word called "on" and as an indigenous word called "kun". A loan word is borrowed from Chinese for both its meaning and pronunciation. An indigenous word is adopted from Chinese only for its meaning, while it is pronounced in indigenous Japanese tongue. A character has quite dissimilar pronunciations when uttered in these different ways. A Japanese can generally distinguish these ways from context. In a dictionary, a loan word pronunciation is customarily marked by the Katakana syllabary, and the indigenous word by the Hiragana syllabary. To code a loan word (e.g., "wave" at 68 in FIG. 5), its pronunciation and Katakana spelling from a dictionary is first coded (see 70 in FIG. 5). The determinative "water", also from the dictionary, is prefixed to the Kana spelling as a determinative according to the stroke-order rule (see 72 in FIG. 5). FIG. 5 lists the homonymic characters of this pronunciation. Since there is no homonymic ambiguity, this string of determinative-pronunciation signs (see 72 in FIG. 5) is the unique coding for said character (see 68 in FIG. 5). Similar procedures are followed to code an indigenous word such as "a sign" (see 74 in FIG. 6) the radical "wood" (a determinative) from the dictionary is prefixed to the Hiragana spelling (from the dictionary) to form the coding (see 76 in FIG. 6). FIG. 6 lists homonyms of this pronunciation. Again this completes the coding, since no homonymic ambiguity exists. In case ambiguity arises as in a few occasions, a marker determinative is chosen to further distinguish one string from another. The string of coding signs for a character is separated by spaces from the adjacent signs for distinction, except for special reasons such as compound words.

Figure 3B:
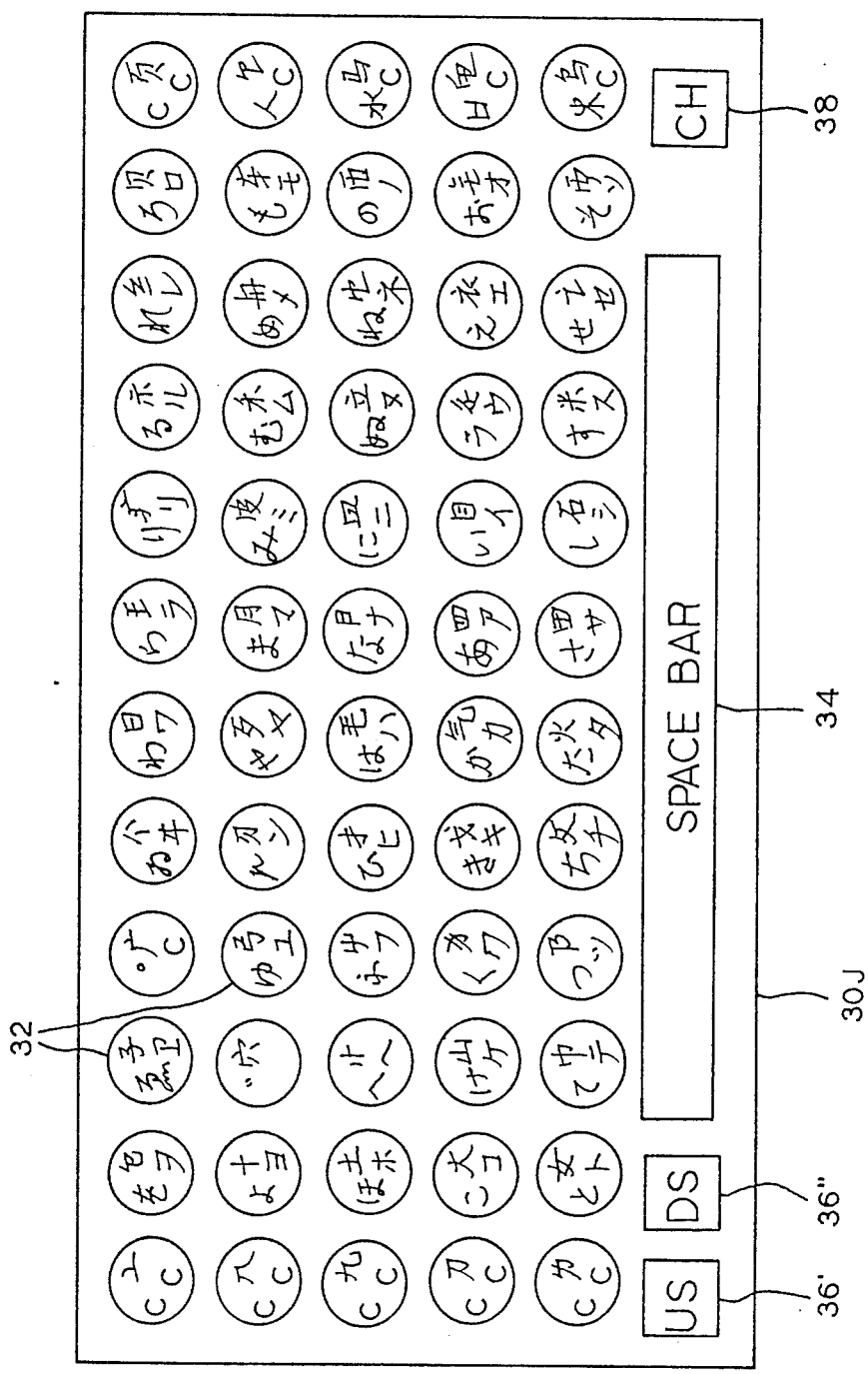
FIG. 3B shows an example of a keyboard for Japanese determinative-pronunciation coding comprising the determinative signs and Japanese Kana syllabaries plus diacritical marks.

With minor differences, the information processing system shown in FIG. 8 for Chinese can be used for Japanese. FIG. 3B shows schematically a Japanese determinative-pronunciation coding keyboard 30J. It is like the one shown in FIG. 3A except for having three (instead of two) shifted positions by simultaneously operating up-shift key 36', down-shift key 36'', or neither for intermediate position. Also, the Hiragana syllabary signs, which are most frequently used, are shown on the left side in the non-shifted position of the respective keys in the second column through the eleventh column, but excluding the two keys in the fourth column, first row, and third column, second row. These two keys are for the diacritical marks. The keys which show the Hiragana signs also show the corresponding Katakana signs, which are in the down-shifted position controlled by key 36. These keys each show a determinative sign in the upper right portion of the key, which is registered when the key is pressed while up-shifted. However, the four most frequently used determinative signs are located in the non-shifted keys in the twelth column, second row through fifth row.

A Korean text may contain both characters and Hangul letters. The Hangul letters are also organized in the juxtaposed non-linear square forms, called juxtaposition, like the characters. A juxtaposition of Hangul letters looks similar to a character. They serve quite different functions. The former is phonetic or alphabetic, while the latter is symbolic or ideographic. The pronunciation of a character is indicated in a Korean dictionary in a juxtaposition of Hangul letters.

For coding characters in Korean, a determinative sign can be affixed to the juxtaposition in four possible positions: to the left, to the right, on the top or at the bottom. At most two determinatives are to be used in coding a character. A determinative occupies one of these positions in accordance to its relative position in the original character being coded. When no clear-cut position can be determined, the left should be chosen first, then the top position.

To code a character in Korean (e.g., "dawn" at 80 in FIG. 7), the radical "sun" (a determinative) is affixed on top of the Hangul pronunciation (see 86 in FIG. 7) both of which are from the dictionary. Thus, the final determinative-pronunciation is as shown at 84 in FIG. 7. The radical "sun" is affixed to the top of the juxtaposition in this coding, since the original character denotes the sun on top of the "horizon" which is depicted by a horizontal bar. FIG. 7 lists the homonymic characters of this pronunciation 86 and their corresponding determinative-pronunciation letter codings. No coding ambiguity exists. The juxtaposition coding of a character is automatically separated from that for other characters. The coding can also be in a linear one-after-another fashion as of 82 of FIG. 7.

Figure 3C:
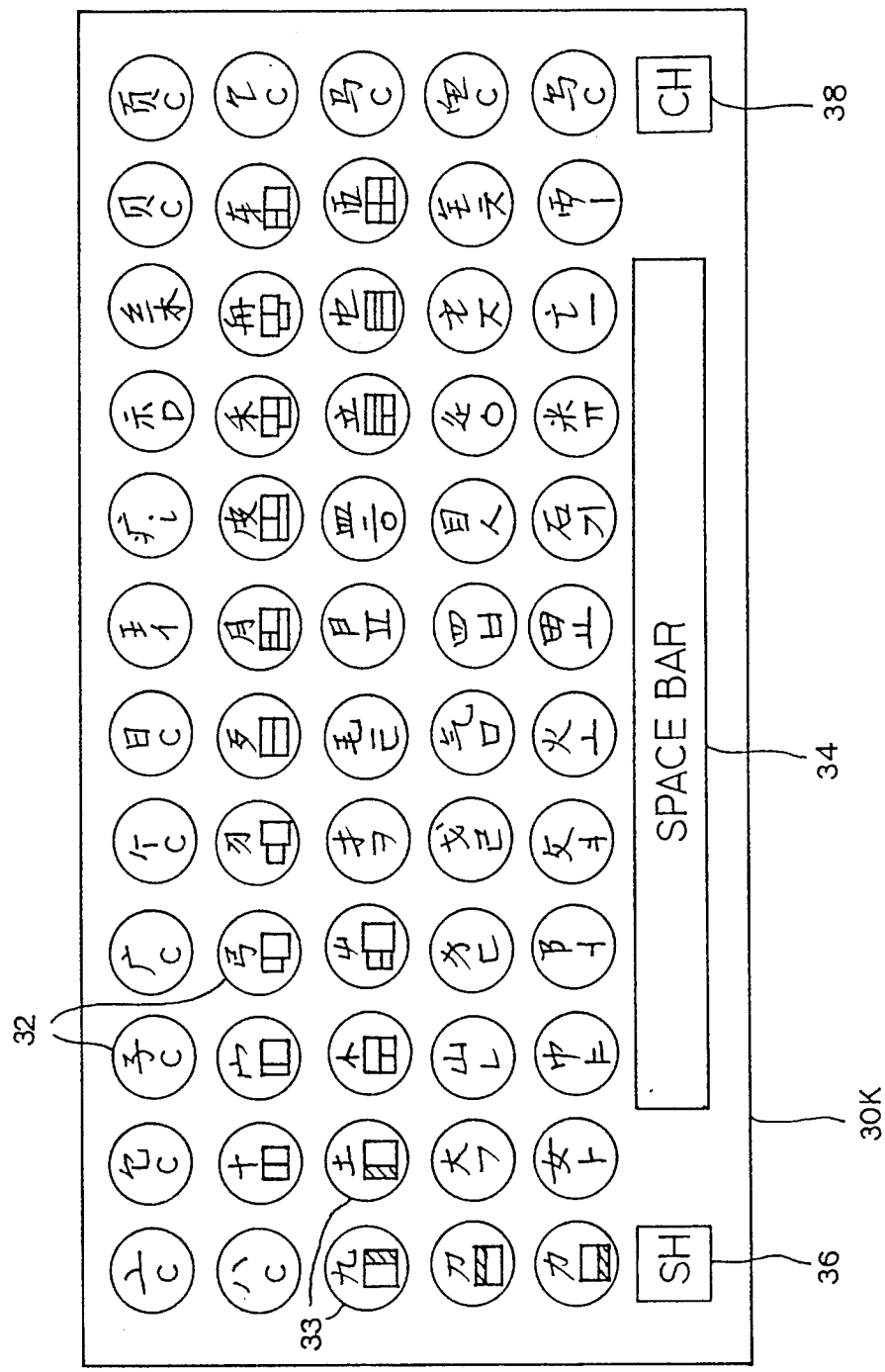
FIG. 3C shows an example of a keyboard for Korean determinative-pronunciation coding comprising the determinative signs, Korean Hangul letters, the juxtapositions and the affixation positions of the determinatives to a juxtaposition.

A conventional Korean keyboard can be modified to input the juxtaposed coding form of this invention. FIG. 3C shows schematically a Korean determinative-pronunciation coding keyboard 30K. It is like the one shown in FIG. 3A except that Hangul signs are each located at the non-shifted positions of the keys in the fourth and fifth rows of the second through eleventh columns; and in the third row of the fifth through eighth columns. The conventional juxtaposition keys are each located at the non-shifted keys in the second row of the second through eleventh columns, and the third row of Columns 3, 4, 9, 10 and 11. The four affixation keys are located each in the first column, rows 3, 4 and 5; and at the third row of the second column. All shifted positions of the keys contain a determinative sign each. The four most frequently used determinative signs are located in the non-shifted positions of the keys in the first row of the seventh through tenth columns.

To input a Korean determinative-pronunciation coding, first the conventional Korean pronunciation spelling is keyed in by inputting a juxtaposition key followed by the composing Hangul letters. The juxtaposition key, when depressed, describes the number, the sizes and the relative positions of the Hangul letters. This is conventional and has been in practice in various Korean typewriters and computers. After all the Hangul letters are input, the invention further facilitates an affixation position key, which is to be pressed followed by an appropriate determinative sign key together with the shifted key 36. This causes the computer to make room by compressing the original juxtaposition for the determinative sign to occupy the affixation position depicted in the shaded area of the new juxtaposition on the key. If another determinative sign is needed, another affixation and determinative plus shifted keys are repeated. To indicate the end of a coding string, the space bar 34 is depressed.

If so desired, a Korean coding string can also be displayed in an one-after-another linear fashion as shown in the third column in FIG. 7. With minor differences, the balance of the information processing system shown in FIG. 8 for Chinese can be used for Korean.

While present preferred embodiments and practices of the invention have been described, it will be understood that the invention is not limited thereto but may be otherwise embodied and practiced within the scope of the following claims.

I claim:

1. The method of entering into the keyboard of an information processor the identification of a series of ideographic characters which are a written form of an Oriental language and which are conventionally written in a certain stroke order, comprising the following steps to identify each particular character of said series.
   (a) referring to keys on the keyboard marked with a first group of signs having phonetic value which indicates the spoken form of said language, and marked with a second group of signs which have determinative value and indicate radicals of ideographic characters;
   (b) selecting from the first group enough signs to describe the spoken form of pronunciation of said particular character in said language;
   (c) where a homonymic ambiguity remains after the first group selection for said particular character, selecting a sign from said second group to denote the radical identification of said particular character; and positioning said selected second group sign after said selection from the first group if the radical represented by the selected second group sign is in the latter portion of the sequence of conventional stroke order for writing said particular character, and if not, positioning said selected second group sign before said first group selection;
   (d) operating the keyboard to enter what has been so selected into said information processor; and
   (e) displaying what has been so entered in the form of the signs shown on the selection of keys, said display being readable to identify the intended character independently of operation of the information processor to display the intended character.

2. The method of claim 1, comprising the steps of entering an indication of separation at the end of the selection of signs for each of a succession of said characters, causing the information processor to cause said selection of signs which identified each character and said indication of separation to be displayed visibly in the form and arrangement in which they were input by operation of the keyboard, and causing said display to show simultaneously said inputted signs and separations for at least several of said successions of characters.

3. The method of claim 1, in which the Oriental language is Chinese and said first group signs are Chinese national phonetic scripts and tonal symbols.

4. The method of claim 1, in which the Oriental language is Japanese and said first group signs are Japanese Kana syllabaries and diacritical marks.

5. The method of claim 1, in which the Oriental language is Korean and said first group signs are Korean Hangul letters.

6. The method of claim 5, wherein said Hangul letters identifying the Korean pronunciation of each particular character are input and displayed as conventionally in a square juxtaposition, wherein each of any said selected second group signs is input together with an affixation identifier indicating its relative position to said juxtaposition, said relative position being consistent with the conventional relative position of the selected sign in said particular character, and wherein all input signs for said particular character are displayed in a square juxtaposition like a conventional Korean character.

7. The method of claim 1, in which said first group signs comprise Roman letters.

8. The method of claim 1, in which said second group signs are radicals.

9. The method of claim 1, in which most of said second group signs shown on the keyboard each correspond in form substantially to a sign shown in the third column of one of the FIGS. 1A and 1B.

10. The method of claim 1, in which said second group signs include some signs in said first group with distinguishing markings to indicate their determinative value.

11. The method of claim 10, in which said first and second groups of signs include Roman letters, said Roman letters being shown in upper case for one of said groups and in lower case for the other of said groups.

12. The method of claim 1, in which the language is Chinese and most of said first and second group signs correspond in form substantially to signs shown within circles in FIG. 3A.

13. The method of claim 1, in which the language is Japanese and most of said first and second group signs correspond in form substantially to signs shown within circles in FIG. 3B.

14. The method of claim 1, in which the language is Korean and most of said first and second group signs correspond in form substantially to signs shown within circles in FIG. 3C.

15. The method of claim 1, comprising the steps of comparing the selection of signs for a particular character which has been entered by operation of the keyboard with stored-in-memory identification of conventional characters on the basis of like entries and thereby identifying the particular character corresponding to said selection, and causing the identified character to be shown visibly.

16. The method of claim 1, in which, where any ambiguity still remains in the case of said particular character after selection of said first second group sign, step (c) is followed by selecting a second sign from said second group of signs for further identification of said particular character, and positioning said second sign on the side of said first group selection opposite to the side thereof where said first selected second group sign was positioned in step (c).

* * * * *